(12) United States Patent
Juliato et al.

(10) Patent No.: US 11,409,286 B2
(45) Date of Patent: Aug. 9, 2022

(54) HARDWARE RANDOM FOREST: LOW LATENCY, FULLY RECONFIGURABLE ENSEMBLE CLASSIFICATION

(71) Applicant: Intel Corporation, Santa Clara, CA (US)

(72) Inventors: Marcio Juliato, Portland, OR (US); Christopher Gutierrez, Hillsboro, OR (US); Shabbir Ahmed, Beaverton, OR (US); Manoj Sastry, Portland, OR (US); Liuyang Yang, Portland, OR (US); Xiruo Liu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 412 days.

(21) Appl. No.: 16/718,495

(22) Filed: Dec. 18, 2019

(65) Prior Publication Data
US 2020/0125097 A1   Apr. 23, 2020

(51) Int. Cl.
| | |
|---|---|
| *G05D 1/00* | (2006.01) |
| *G06N 5/04* | (2006.01) |
| *G06F 16/901* | (2019.01) |
| *G06K 9/62* | (2022.01) |

(52) U.S. Cl.
CPC ....... *G05D 1/0088* (2013.01); *G06F 16/9027* (2019.01); *G06K 9/6267* (2013.01); *G06N 5/045* (2013.01); *G05D 2201/0213* (2013.01)

(58) Field of Classification Search
CPC ......... G05D 1/0088; G05D 2201/0213; G06F 16/9027; G06K 9/6267; G06N 5/045
USPC .......................................................... 701/23
See application file for complete search history.

(56) References Cited

U.S. PATENT DOCUMENTS

| | | | | |
|---|---|---|---|---|
| 9,292,767 | B2 * | 3/2016 | Oberg | G06K 9/6282 |
| 2003/0217234 | A1 * | 11/2003 | Rowlands | G06F 12/0817 |
| | | | | 711/141 |
| 2018/0046939 | A1 * | 2/2018 | Meron | G06F 21/00 |
| 2020/0193332 | A1 * | 6/2020 | Zhang | G06N 20/20 |

* cited by examiner

*Primary Examiner* — Gertrude Arthur Jeanglaude
(74) *Attorney, Agent, or Firm* — KDB Firm PLLC

(57) ABSTRACT

Systems, methods, computer program products, and apparatuses for low latency, fully reconfigurable hardware logic for ensemble classification methods, such as random forests. An apparatus may comprise circuitry for an interconnect and circuitry for a random forest implemented in hardware. The random forest comprising a plurality of decision trees connected via the interconnect, each decision tree comprising a plurality of nodes connected via the interconnect. A first decision tree of the plurality of decision trees comprising a first node of the plurality of nodes to: receive a plurality of elements of feature data via the interconnect, select a first element of feature data, of the plurality of elements of feature data, based on a configuration of the first node, and generate an output based on the first element of feature data, an operation, and a reference value, the operation and reference value specified in the configuration of the first node.

20 Claims, 14 Drawing Sheets

HARDWARE RANDOM FOREST: LOW LATENCY, FULLY RECONFIGURABLE ENSEMBLE CLASSIFICATION

BACKGROUND

Systems such as autonomous vehicles demand agile and retrainable classification mechanisms, such as random forests. Doing so may allow these systems to detect different types of behavior, which may improve overall safety and performance. However, these classification systems often change over time. Therefore, implementing classification mechanisms in hardware require the flexibility to allow the hardware to reflect the changing classification mechanisms.

DETAILED DESCRIPTION

Figure 1:
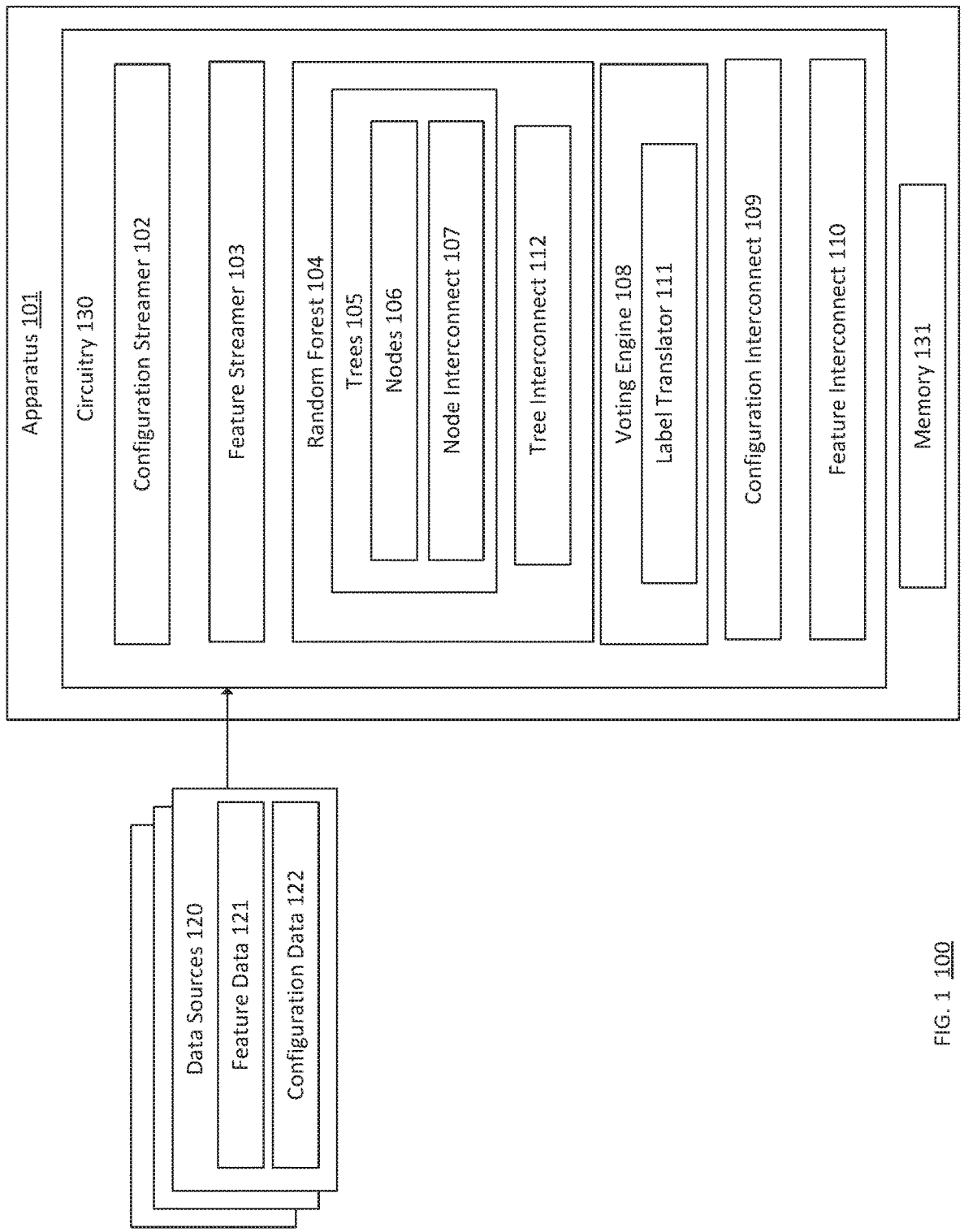
FIG. 1 illustrates an embodiment of an apparatus.

Embodiments disclosed herein provide low latency, fully reconfigurable hardware logic for ensemble classification methods, such as random forests. Generally, embodiments disclosed herein may provide reconfigurable logic that can quickly adapt to mutating tree structures. For example, a random forest may comprise a plurality of decision trees, each tree comprising a plurality of nodes. Embodiments disclosed herein may allow the reconfiguration of the trees, nodes, and/or associated interconnects to provide full parallel hardware execution with efficient routing of feature data to the nodes. By dynamically interconnecting configurable tree nodes and providing the feature data in an optimized order, embodiments disclosed herein achieve fully reconfigurable parallelized execution and allow for classification based on a subset of feature data.

Generally, a configuration file may specify the configuration for a random forest and its components. The configuration file may generally specify all parameters for the random forest, including the trees, nodes, interconnect(s), label translations, and optimal orderings of feature data. Whenever the configuration changes, the underlying hardware may be modified based on the configuration file. For example, a tree node may compare a first element of feature data to a reference value. If the reference value changes, the node configuration may be updated to reflect the changed reference value. Doing so allows for efficient reconfiguration of the underlying hardware by reprogramming only a portion of the hardware rather than reprogramming the hardware in its entirety.

Advantageously, embodiments disclosed herein provide techniques to improve the processing performance of random forests implemented at least partly in hardware. For example, by providing reconfigurable components, embodiments disclosed herein may improve the parallel processing performance of the random forest hardware. Furthermore, by improving the parallel processing performance of the random forest hardware, embodiments disclosed herein allow for faster decision making. For example, when embodied in an autonomous vehicle, the random forest hardware may enhance the safety of the operation of the autonomous vehicle, e.g., by detecting collisions, detecting malicious attacks to computing components of the autonomous vehicles, and the like, more quickly and/or accurately than conventional solutions.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a system 100. As shown, the system 100 includes at least one apparatus 101 and a plurality of data sources 120. As shown, the apparatus 101 includes circuitry 130 and a memory 131. The circuitry 130 of the apparatus 101 comprises any type of circuitry, such as field programmable gate arrays (FPGAs), processors, microprocessors, microcontrollers, circuits, circuit elements (e.g., transistors, resistors, capacitors, inductors, and so forth), integrated circuits, application specific integrated circuits (ASIC), system on a chip (SoC), programmable logic array (PLA), complex programmable logic device (CPLD), programmable logic devices (PLD), digital signal processors (DSP), processor circuits, memory units, logic gates, registers, semiconductor device, chips, microchips, chip sets, and so forth.

Examples of the memory 131 may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In various embodiments, the system 100 including the apparatus 101 (or multiple apparatuses 101) may be implemented in an autonomous vehicle. Generally, the apparatus 101 provides low latency fully reconfigurable ensemble classifications. In such embodiments, the autonomous vehicle includes one or more of the data sources 120. The data sources 120 are representative of any type of data source that provides feature data 121 and/or configuration data 122. For example, the data sources 120 may be hardware, software, and/or a combination of hardware and software. In one example, the data sources 120 include electronic control units (ECUs) of an autonomous vehicle. In other examples, the data sources 120 may be storage devices, memory devices, sensors, cameras or other image capture devices, applications, databases, streaming data sources, and/or other programmable logic. Although depicted as being provided by the same data sources 120, in some embodiments, the feature data 121 and the configuration data 122 may be provided by different data sources 120.

The feature data 121 is representative of any type of data describing one or more features (or attributes). For example, the feature data 121 may include data describing attributes of an autonomous vehicle, such as current speed of the vehicle, engine temperature, fuel reserve, etc. In some embodiments, the feature data 121 is generated by one or more processing algorithms (e.g., a machine learning algorithm, etc.). Generally, each type of feature in the feature data 121 may have a unique feature identifier (ID) (e.g., a unique ID for current speed, a unique ID for the engine temperature, a unique ID for fuel reserve, etc.). The configuration data 122 is representative of any type of data defining configuration parameters for the apparatus 101. For example, the configuration data 122 may include configuration parameters for the random forest 104, one or more trees 105 of the random forest 104, the nodes 106 of each tree 105, the node interconnect 107 of each tree 105, the tree interconnect 112 of the random forest 104, the voting engine 108, the configuration interconnect 109, and/or the feature interconnect 110. Generally, each element of configuration data 122 may include a unique ID for each associated entity of the apparatus 102, e.g., a random forest ID, tree ID, node ID, etc. Doing so allows the relevant components of the apparatus 101 to consume the correct configuration data 122 when streamed by the configuration streamer 102.

As shown, the circuitry 130 of the apparatus 101 includes a configuration streamer 102, a feature streamer 103, one or more random forests 104, a voting engine 108, a configuration interconnect 109, and a feature interconnect 110. The random forest 104 includes a plurality of decision trees 105 and a tree interconnect 112. Each tree 105 includes a plurality of nodes 106 and a node interconnect 107. Although depicted as separate interconnects, the interconnects 107, 109, 110, 112 may be part of a single interconnect (also referred to as a bus or a communications network).

As described in greater detail herein, the configuration streamer 102 is configured to stream the configuration data 122 to the various components of the apparatus 101 via the configuration interconnect 109. The random forest 104 is an example of an ensemble classification structure for classification tasks, regression tasks, and other tasks based on the trees 105. The trees 105 may be generated during a training phase. The output of the random forest 104 is generally based on the output of each tree 105, such as the most common classification of the trees 105 and/or the mean prediction of the trees 105. For example, for an image classification task, each tree 105 may generate an output classifying an object depicted in the image as a type of animal, e.g. a dog, a cat, a bird, etc. In such an example, the final output of the random forest 104 is the mode of the outputs all trees 105. Therefore, if three of the trees 105 classify the animal as a cat, two of the trees 105 classify the animal as a dog, and one tree 105 classifies the animal as a bird, the output of the random forest 104 is the cat classification.

As described in greater detail herein, the node interconnect 107 generally interconnects the nodes 106 of each tree 105 to facilitate fully parallel processing by each node 106 in each tree 105. Doing so improves processing performance relative to conventional software-based trees which have a conventional software tree structure (e.g., a root node and one or more child nodes on different tree levels) that does not allow for parallel processing. The voting engine 108 is configured to efficiently compute votes based on the output of each tree 105 in the random forest 104. The label translator 111 of the voting engine 108 provides techniques to translate decisions generated by each tree 105 to a corresponding label. The tree interconnect 112 connects the plurality of trees 105 of the random forest 104. The feature streamer 103 receives the feature data 121 from the data sources 120. The feature interconnect 110 is an interconnect over which the feature streamer 103 streams the feature data 121 to the random forest 104.

As stated, the system 100 may be implemented in an autonomous vehicle. In such embodiments, the apparatus 101 may analyze the feature data 121 for any number of purposes. For example, the feature data 121 may be analyzed to detect attacks to components of the autonomous vehicle, such as masquerading attacks, flooding attacks, and/or suspension attacks to one or more ECUs of the autonomous vehicle. If the output of the random forest 104 indicates an ECU is subject to an attack, one or more operations may be performed in response to the attack. For example, an alert may be generated, the impacted ECU may be taken offline, the impacted ECU may be replaced with a standby ECU, and/or messages generated by the impacted ECU may be modified to prevent consumption by other ECUs in the autonomous vehicle. For example, if the impacted ECU may cause the autonomous vehicle to travel at an unsafe speed, messages generated by the impacted ECU may be modified such that the autonomous vehicle does not travel at the unsafe speed. As another example, the speed of the autonomous vehicle may be modified from the unsafe speed to a slower speed (e.g., the speed limit where the vehicle is traveling).

Figure 2:
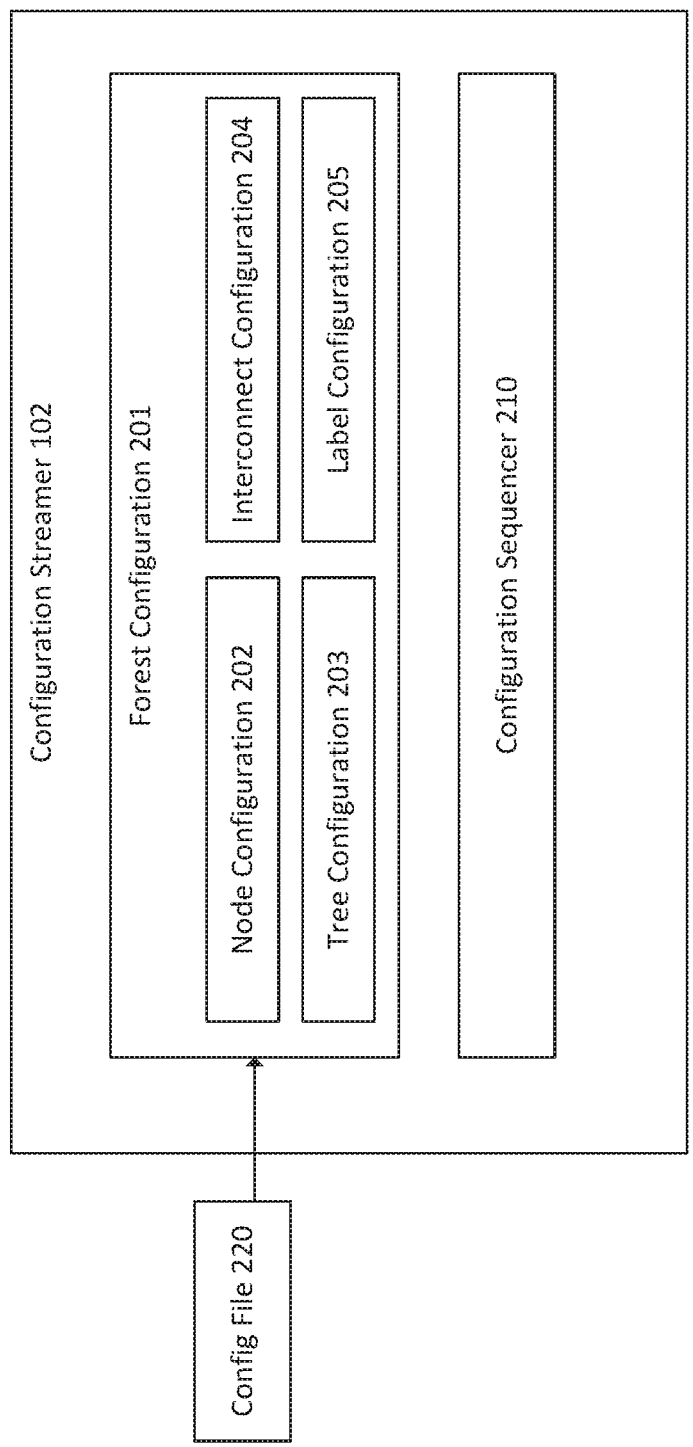
FIG. 2 illustrates an example embodiment of a configuration streamer.

FIG. 2 is a schematic 200 depicting components of the configuration streamer 102 in greater detail. As shown, a configuration file 220 may be provided as input to the configuration streamer 102. In some embodiments, the configuration file 220 may be received as configuration data 122 from the data sources 120. The configuration file 220 may be generated during a training of the random forest 104. The configuration file 220 may generally specify a plurality of configuration parameters for the random forest 104. The configuration parameters include configurations for the interconnects 107, 109, 110, 112, the random forest 104, the trees 105, the nodes 106, the voting engine 108, and/or the label translator 111. Once received, the configuration streamer 102 may store various portions of the configuration file 220 as the forest configuration 201. The forest configuration 201 includes a node configuration 202 for configuration of each node 106 in each tree 105, a tree configuration 203 for configuration of each tree 105, an interconnect configuration 204 for configuration of the interconnects 107, 109, 110, 112, and a label configuration 205 for configuration of the label translator 111. Generally, each tree 105 may be associated a unique tree identifier in the tree configuration 203 and each node 106 may be associated with a unique node identifier in the node configuration 202. Doing so allows the trees 105 and nodes 106 to apply the tree configuration 203 and node configuration 202, e.g., by selecting configuration data that is associated with the correct tree and/or node identifiers.

When a new forest configuration 201 is generated based on the configuration file 220, a configuration sequencer 210 of the configuration streamer 102 may transmit the relevant portions of the forest configuration 201 via the configuration interconnect 109. Advantageously, rather than reprogramming the apparatus 101 in its entirety, the configuration streamer 102 may reprogram only those portions of the apparatus 101 having an updated configuration. For example, when receiving node configuration data 202, a nodes 106 may apply updates associated with the node ID assigned to the given node in the configuration data 202. Similarly, when receiving tree configuration data 203, the trees 105 may apply updates associated with the tree ID assigned to the tree 105 in the configuration data 203.

Figure 3:
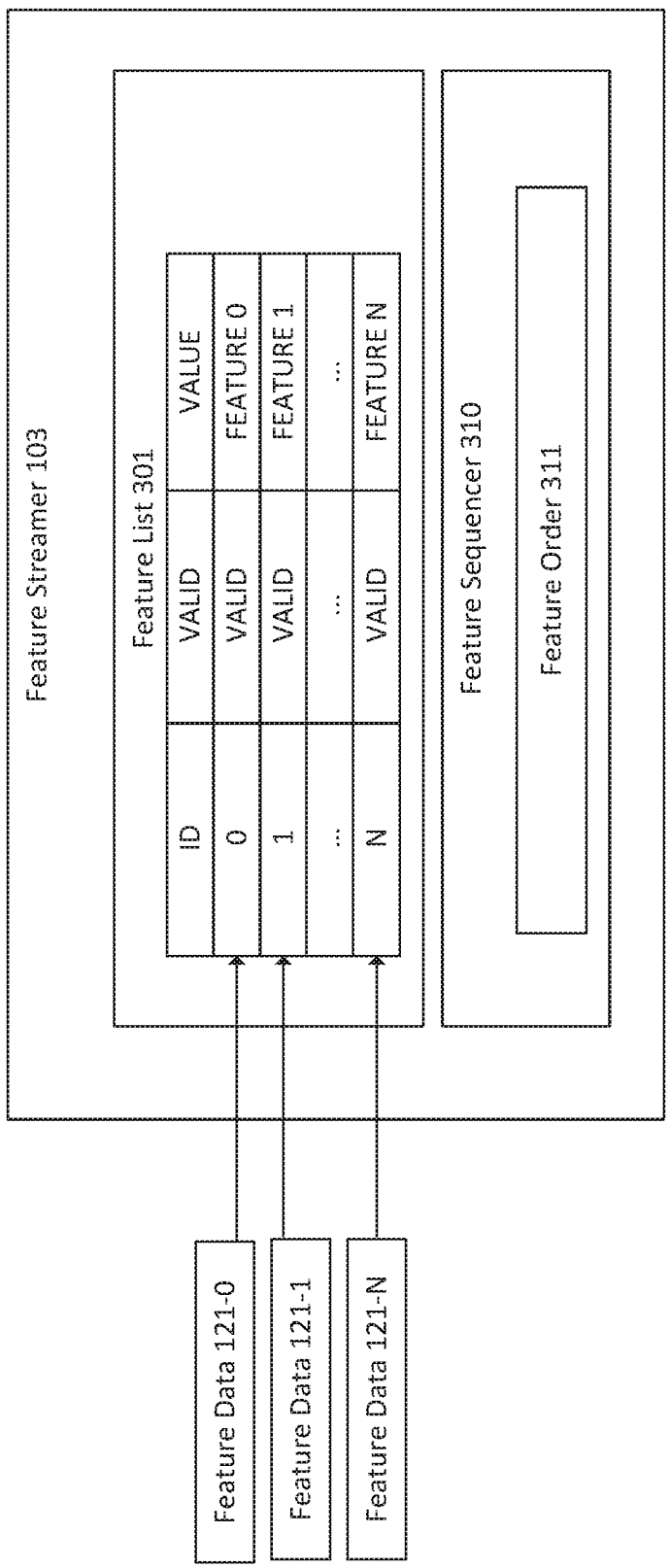
FIG. 3 illustrates an example embodiment of a feature streamer.

FIG. 3 is a schematic 300 depicting components of the feature streamer 103 in greater detail. As shown, the feature streamer 103 includes a feature list 301. The feature list 301 generally specifies each feature of a plurality of features, where each feature is associated with a respective feature ID, an indication of whether the feature data is valid (e.g., available to be streamed), and a corresponding value. For example, as shown, feature data 121-0 may correspond to the entry having an ID of 0 in the feature list 301, which is associated with an example "Feature 0". Similarly, feature data 121-1 may correspond to the entry having an ID of 1 in the feature list 301, which is associated with an example "Feature 1". Further still, feature data 121-N (where N is a positive integer greater than 1) may correspond to the entry having an ID of N in the feature list 301, which is associated with an example "Feature N". Generally, the values of Feature 0 . . . Feature N may take any relevant value (e.g., integers, binary values, etc.). As described in greater detail below, the node configuration 202 for each node 106 specifies one or more feature IDs that the node 106 is to select for processing (or consideration).

As shown, the feature streamer 103 includes a feature sequencer 310 which streams the received feature data 121 according to a feature order 311. The feature order 311 may be specified in the configuration file 220 and determined during training. The feature order 311 may generally specify an ordering of the most important, or relevant features in the feature data 121. The feature order 311 may be determined based on the number of nodes 106 in the trees 105 and/or forest 104 that consider (or process) a given feature. For example, if the node configuration 202 of 1,000 nodes 106 in the forest 104 specify to process feature "X" while the node configuration 202 of 500 nodes 106 in the forest specify to process feature "Y", the feature order 311 may specify to stream feature X prior to streaming feature Y. Therefore, in such examples, if feature data 121 for features X and Y are available, the feature sequencer 310 may transmit the feature data 121 for feature X prior to transmitting the feature data for feature Y.

Additionally and/or alternatively, the feature order 311 may be determined based on the paths in each tree 105 that include each feature. Generally, if a feature is included in a shorter path and/or a path that allows for more quickly reaching a decision based on the feature, the feature may have a relatively higher position in the feature order 311 than other features. Therefore, if feature "Z" is in the shortest path to a decision in a tree 105 (or multiple paths of one or more trees 105) than a feature "A", feature Z may have a higher position in the feature order 311 relative to feature A. Therefore, in such examples, if feature data 121 for features A and Z are available, the feature sequencer 310 may transmit the feature data 121 for feature Z prior to transmitting the feature data for feature A. In some embodiments, a path score may be computed for each feature, where the path score is based on the path lengths of each tree path the feature is included in. For example, the path score may be the average path length of all paths the feature is included in. The path score may be used to rank each feature for the feature order. Additionally and/or alternatively the position of nodes 106 in the tree 105 that consider a given feature may be used to determine the feature order 311, where features that are considered earlier than other features have a higher relative ordering in the feature order 311. For example, if a node 106-1 processes feature X before a node 106-2 processes feature Y, feature X may have a higher relative ordering in the feature order 311.

Figure 4:
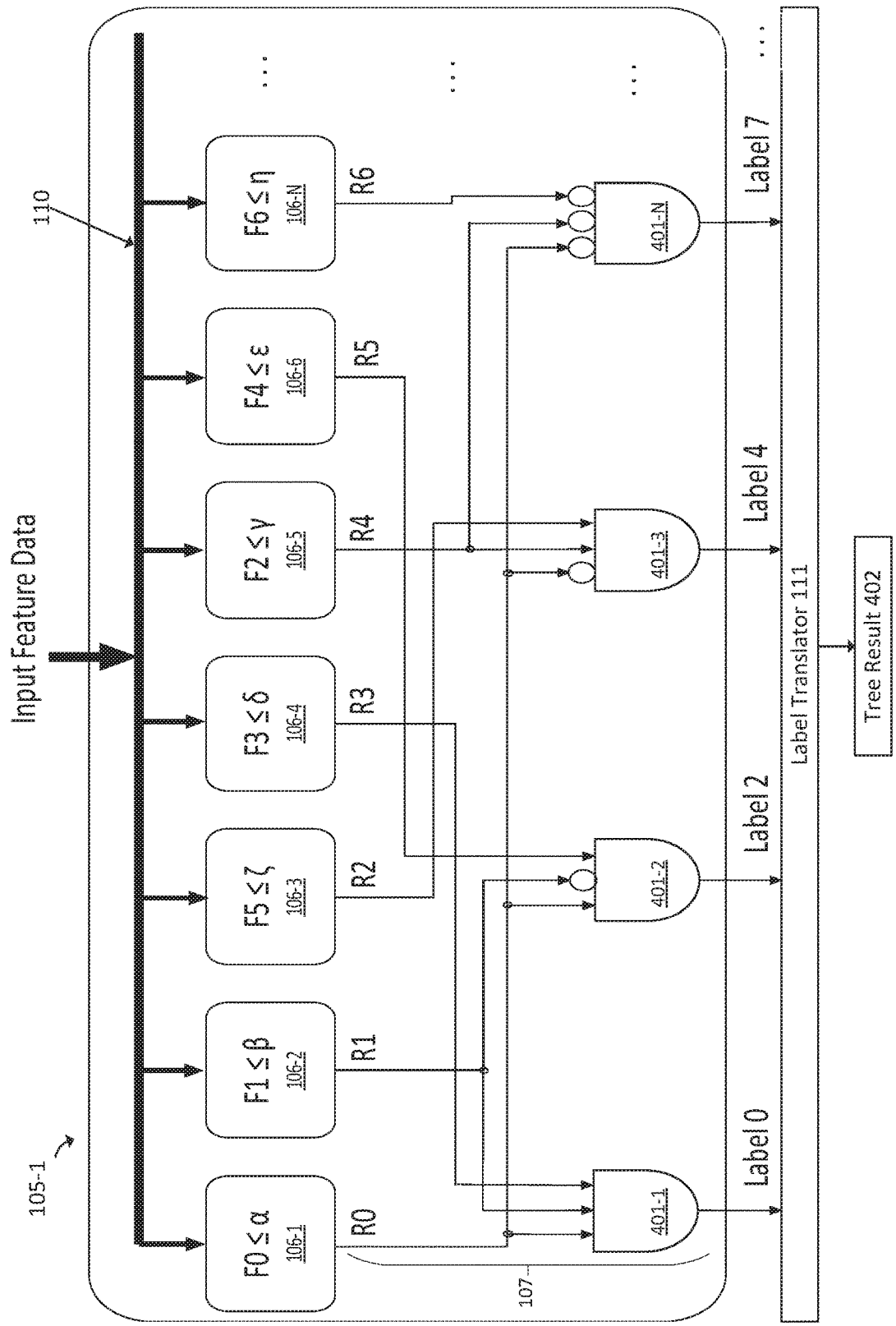
FIG. 4 illustrates an example embodiment of a reconfigurable tree.

FIG. 4 is a schematic 400 depicting an example tree 105-1 of the random forest 104, according to one embodiment. As shown, the tree 105-1 includes example nodes 106-1 through 106-N, where 106-N is a positive integer greater than 6. The number of nodes depicted in the tree 105-1 is for illustrative purposes only, as the tree 105-1 may include any positive number of nodes 106. Generally, each node 106 is configured to receive feature data via the feature interconnect 110, select one or more features from the received feature data, and apply an operation to the selected feature data to a reference value to generate an output. For example, as shown, node 106-1 selects feature data "F0" and determines whether the value of F0 is less than or equal to a reference value α. Doing so may generate an output R0 reflecting whether the value of F0 is less than or equal to α.

As described in greater detail herein, the output of each node 106-1 through 106-N may be routed through the node interconnect 107. For example, as shown, the logic gates 401-1 through 401-N (where 401-N is any positive integer greater than 3) may consider certain outputs of each node based on a configuration for the node interconnect 107. Doing so allows the logic gates 401-1 through 401-N to generate a binary decision for a given output label, e.g., label 1, label 2, etc. The binary label decisions may then be translated to final labels by the label translator 111, which outputs a tree result 402.

Figure 5:
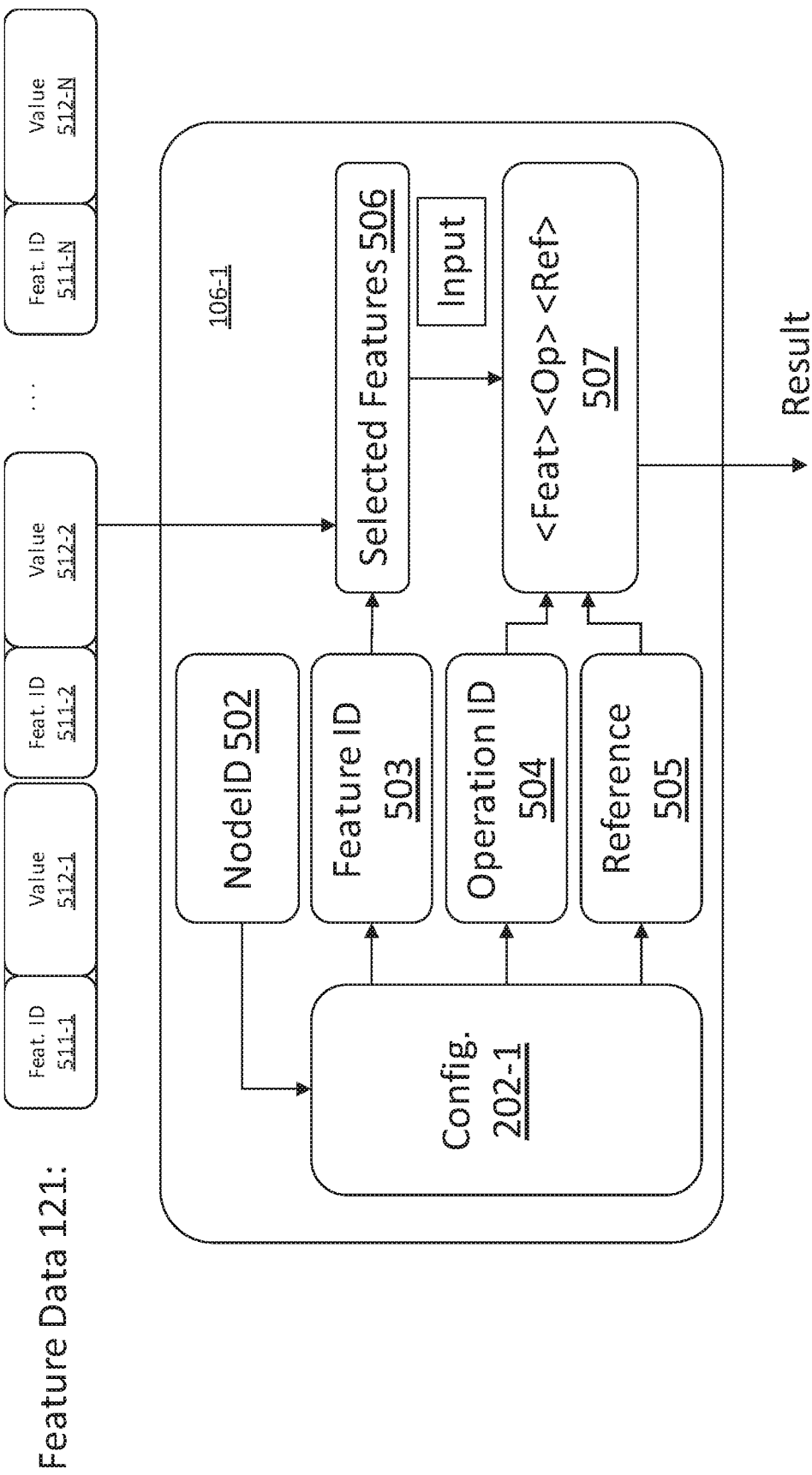
FIG. 5 illustrates an example embodiment of a reconfigurable tree node.

FIG. 5 is a schematic 500 depicting an example node 106-1 in greater detail. As shown, the node 106-1 may receive feature data 121 as input. As shown, the feature data 121 may be transmitted in batches. For a given element of feature data 121, a feature ID 511 and a feature value 512 may be specified. For example, as shown, feature ID 511-1 may have an associated feature value 512-1, while feature ID 511-2 has an associated feature value 512-2, and feature ID 511-N has an associated feature value of 512-N. In such an example, the feature ordering 311 of the feature streamer 103 may specify an ordering that causes feature ID 511-1 to be streamed before feature ID 511-2 and causes feature ID 511-2 to be streamed before feature ID 511-N. Therefore, in the depicted example, feature ID 511-1 has a higher relative priority than feature ID 511-2 and feature ID 511-N, while feature ID 511-2 has a higher relative priority than feature ID 511-N. Furthermore, for example, feature ID 511-1 may be the feature ID of "0" while the associated feature value 512-1 has the value for the feature, such as 0.9.

As shown, the node 106-1 includes the node configuration 202-1, which may be at least a portion of the node configuration 202 of FIG. 2 for the node 106-1. Generally, the node configuration 202-1 specifies which feature ID(s) the node 106-1 should select for processing, an operation ID, and a reference value. Generally, when receiving the feature data 121, the node ID 502 (which uniquely identifies the node 106-1) may be used as an index into the node configuration 202-1. Doing so returns a feature ID 503, an operation ID 504, and a reference value 505 from the node configuration 202-1. The node 106-1 may use the feature ID 503 to select one or more of the elements of feature data from the feature data 121. For example, if the feature ID 503 is 511-1, the node 106-1 may select the feature 511-1 and corresponding value 512-1 as the selected features 506. In doing so, the node 106-1 may ignore or otherwise refrain from processing other elements of feature data, such as the feature 511-2 and corresponding value 512-2 and/or feature 511-N and corresponding value 512-N.

In processing block 507, the node 106-1 may process the selected features 506 based on the corresponding operation ID 504 and reference value 505. In some embodiments, the operation ID 504 may be associated with a type of operation (e.g., an operation ID of 0 may be associated with the less than operation, an operation ID of 1 may be associated with the greater than operation, and so on). The reference value 505 may be a value that the value 512-N of the selected feature 506 is compared to. For example, if feature 511-1 is the selected feature 506, the feature value 512-N is 10, the operation ID 504 is 0, and the reference value 505 is 20, the processing block 507 may determine whether 10 is less than 20. Doing so generates a result which is the output of the node 106-1 (e.g., an evaluation of true in the previous example of 10 being less than 20).

Figure 6:
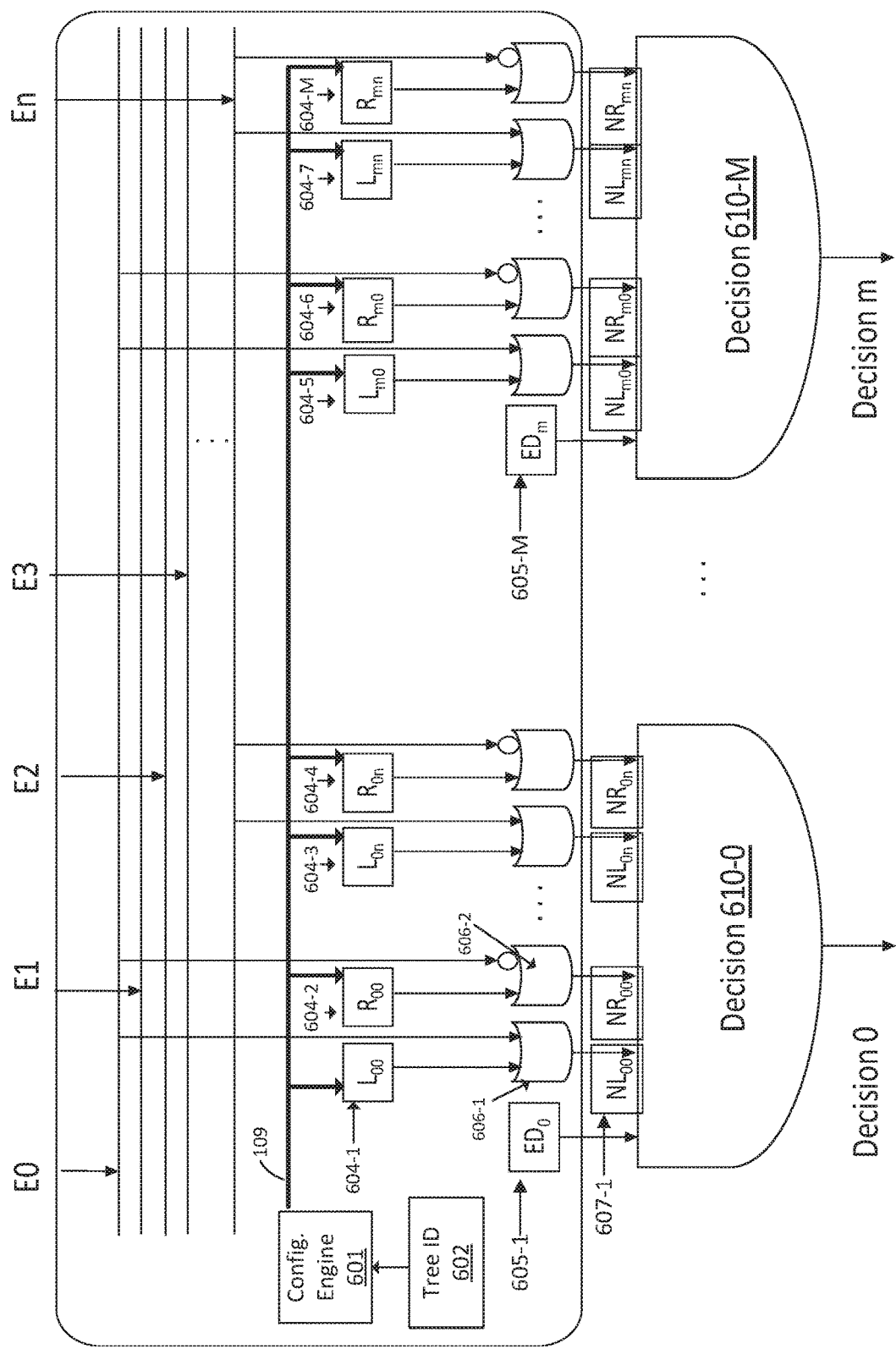
FIG. 6 illustrates an example embodiment of a reconfigurable interconnect.

FIG. 6 is a schematic 600 depicting components of the node interconnect 107 in greater detail. As shown, the evaluation outputs E0 through En generated by the nodes 106 are received by the node interconnect 107. Registers 604-1 through 604-M may generally store binary values indicating whether the evaluation output E0-En should be considered when making a decision. For example, register 604-1 corresponds to whether E0 is considered or not considered, while register 604-2 corresponds to whether the inverse of E0 is considered or not considered. Generally, only one register of a pair of left/right registers (e.g., register 604-1 or register 604-2) may be enabled, as each corresponds to an output branch of a node (e.g., the decision tree only flows to one branch based on the evaluation output of the node, such as to the left if E0 is true, or to the right if E0 is false). The values in the registers 604-1 through 604-M may be programmed by the configuration engine 601 based on the interconnect configuration 204. The configuration engine 601 may receive the interconnect configuration 204 from the configuration streamer 102 and apply the configuration matching a corresponding tree ID 602. Each register $L_{mn}$ or $R_{mn}$ in FIG. 6 may store a corresponding value as specified by the interconnect configuration 204. Similarly, the configuration engine 601 may program the values in the enable decision registers 605-1 through 605-M based on the interconnect configuration 204 received from the configuration streamer 102.

The data stored in the registers 604 may be provided as input to one or more logic gates 606, which may comprise OR gates or any other type of logic gate. Doing so provides efficient processing, as the values of the evaluation results E0 through En may not need to be considered. Instead, the values in the registers 604 indicate whether the evaluation is true or false. For example, if the value in register 604-1 is "1", the output 607-1 of OR gate 606-1 is "1", or true (in other words, E0 is not considered). If the value in register 604-1 is "0", the output 607-1 of OR gate 606-1 is "1", or true, only when E0 is true, in other words, E0 is taken into account in the construction of output 607-1. If E0 is "1", the output 607-1 is "1". Similarly, if E0 is "0", the output 607-1 is "0".

The enable decision registers 605-1 through 605-M, labeled "$ED_0$" through "$ED_m$", are used to determine whether to enable the corresponding AND decision gate 610-0 through 610-M. For example, if $ED_0$ 605-1 has a value of 0, decision gate 610-0 is disabled. Similarly, if $ED_m$ 605-M has a value of 1, decision gate 610-$m$ is enabled. Generally, an enable decision register $ED_0$ through $ED_m$ is set based on whether all registers 604 connected to a given decision gate 610 are set to "1". Otherwise, if one or more registers 604 connected to a given decision gate 610 are set to "0", the corresponding evaluation result (e.g., E0 through En) is relevant, and the decision gate 610 is not disabled. If enabled, each of the decision gates 610-0 through 610-M generate a decision as output. Generally, each decision gate 610-0 through 610-M operates independently. Therefore, for example, decision gate 610-0 may be independently enabled based on the values of registers 604-1, 604-2, 604-3, and 604-4 (e.g., all registers 604 connected to decision gate 610-0). Similarly, decision gate decision gate 610-M may be independently disabled based on the values of registers 604-5, 604-6, 604-7, and 604-M (e.g., all registers 604 connected to decision gate 610-M).

Advantageously, the configuration depicted in FIG. 6 is an optimization relative to conventional solutions. More specifically, by configuring the enable decision registers 605-1 through 605-M, embodiments disclosed herein may forego the need to stream data into some of the registers 604 that drive the decision gates 610, thereby optimizing system performance. In other embodiments, the enable decision registers 605-1 through 605-M may be removed. In such embodiments, the registers 604 need to be set to determine whether the corresponding decision gates 610 are activated. Doing so may save resources by not including the enable decision registers 605-1 through 605-M, but may require additional configuration parameters to be specified in the configuration data for the node interconnect 107.

Figure 7:
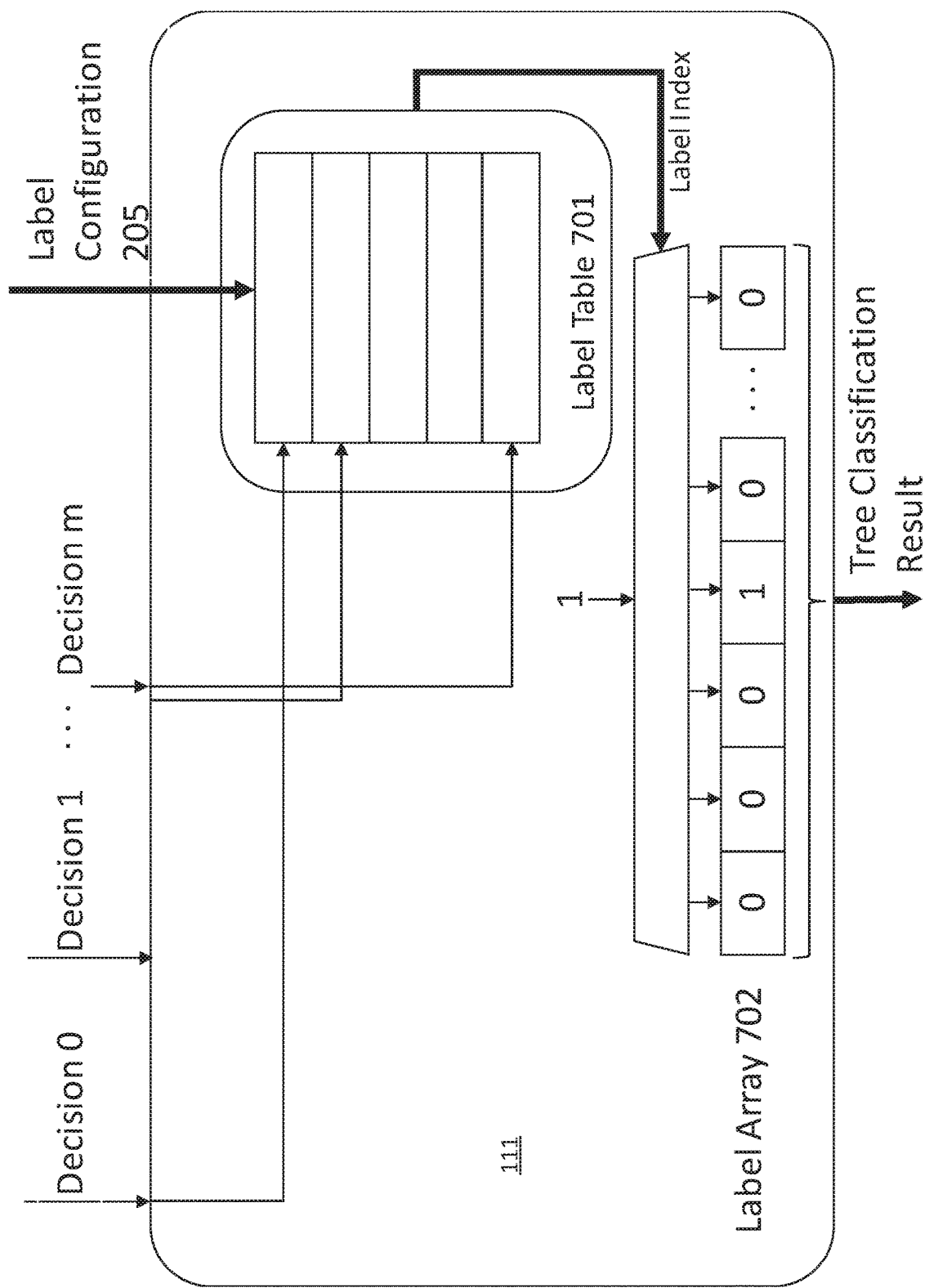
FIG. 7 illustrates an example embodiment of a label translator.

FIG. 7 is a schematic 700 illustrating the label translator 111 in greater detail. As shown, a label table 701 and a label array 702 may be programmed based on the label configuration 205. In some embodiments, the label table 701 may include a subset of a plurality of possible decision labels that can be outputted by a tree 105. Stated differently, the label table 701 may include less than all of the plurality of possible decision labels that the tree 105 can output. In other embodiments, the label table 701 may include all possible decision labels that can be outputted by a tree 105. The label array 702 includes all possible decision labels that can be outputted by the random forest 104, which includes all decision labels in the label table 701 and additional labels not present in the label table 701. Therefore, when a decision is received from a tree 105, the decision is used to index into the label table 701. Doing so may return an index value which is used to index into the label array 702. The corresponding entry of the label array 702 may then be returned as the classification result for the tree 105. The entries in the label array 702 are mutually exclusive, as only one classification result can be returned for a given tree 105.

Figure 8:
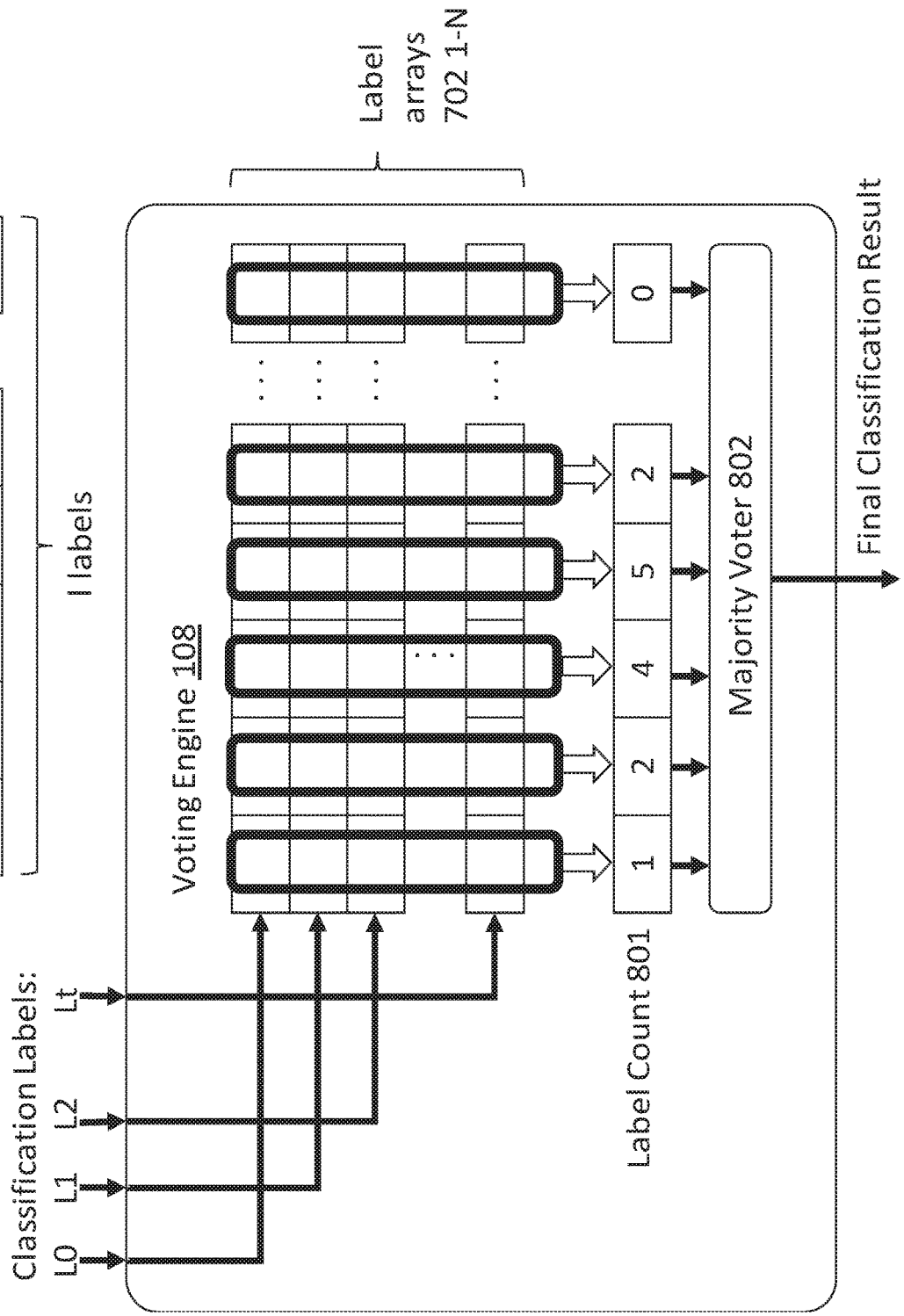
FIG. 8 illustrates an example of a voting engine.

FIG. 8 is a schematic 800 illustrating the voting engine 108 in greater detail. As shown, the voting engine 108 receives the classification results for a plurality of trees 105 (e.g., a label array 702-1 through 702-N for trees 105-1 through 105-N). The voting engine 108 may compute a label count 801 which is an array reflecting the values in each label array 702-1 through 702-N. In one embodiment, the voting engine 108 performs a Hamming weight computation to efficiently sum the values in the label arrays 702-1 through 702-N. Generally, the label count 801 reflects a count of trees 105 generating the corresponding label (or result) as a final output. For example, as shown, the first entry in the label count 801 is a value of 1, indicating a single tree 105 returned the corresponding label as a result (e.g., classifying a fruit depicted in an image as an apple). The majority voter 802 may select the greatest value in the label count 801 as the final classification result of the random forest 104. For example, the fourth entry in the label count 801 has the greatest depicted value of 5 (which may correspond to classifying the fruit as an orange). Therefore, the classification corresponding to the fourth entry (e.g., an orange) may be returned as the classification result for the random forest 104, as the most common classification generated by the trees 105 in the random forest 104 was the orange.

In some embodiments, a classification result for the random forest 104 may be returned if a majority decision is detected prior to one or more trees 105 generating a classification result. For example, if there are ten trees 105 in the random forest 104 and six of the trees 105 return the same classification (e.g., classify the fruit as an orange), a majority decision has been reached. Therefore, the majority voter 802 may return the majority decision (e.g., the orange) as the final classification result for the random forest 104 without waiting for the remaining four trees 105 to generate a classification result.

In some examples, a tie may exist (e.g., 5 of the trees 105 may classify the fruit as an orange, while the remaining 5 trees 105 may classify the fruit as an apple). In such examples, the voting engine 108 may define one or more policies to resolve the tie. One example policy may specify to select one of the labels (e.g., select orange or apple as the classification result). Another example policy would output both labels (e.g., return both orange and apple as the classification result). Yet another example policy outputs no result and indicate that a tie has occurred. In some embodiments, the number of trees 105 in the forest 104 may be defined to avoid ties (e.g., by including an odd number of trees 105, including a greater number of trees 105 than possible classification results, etc.).

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 9:
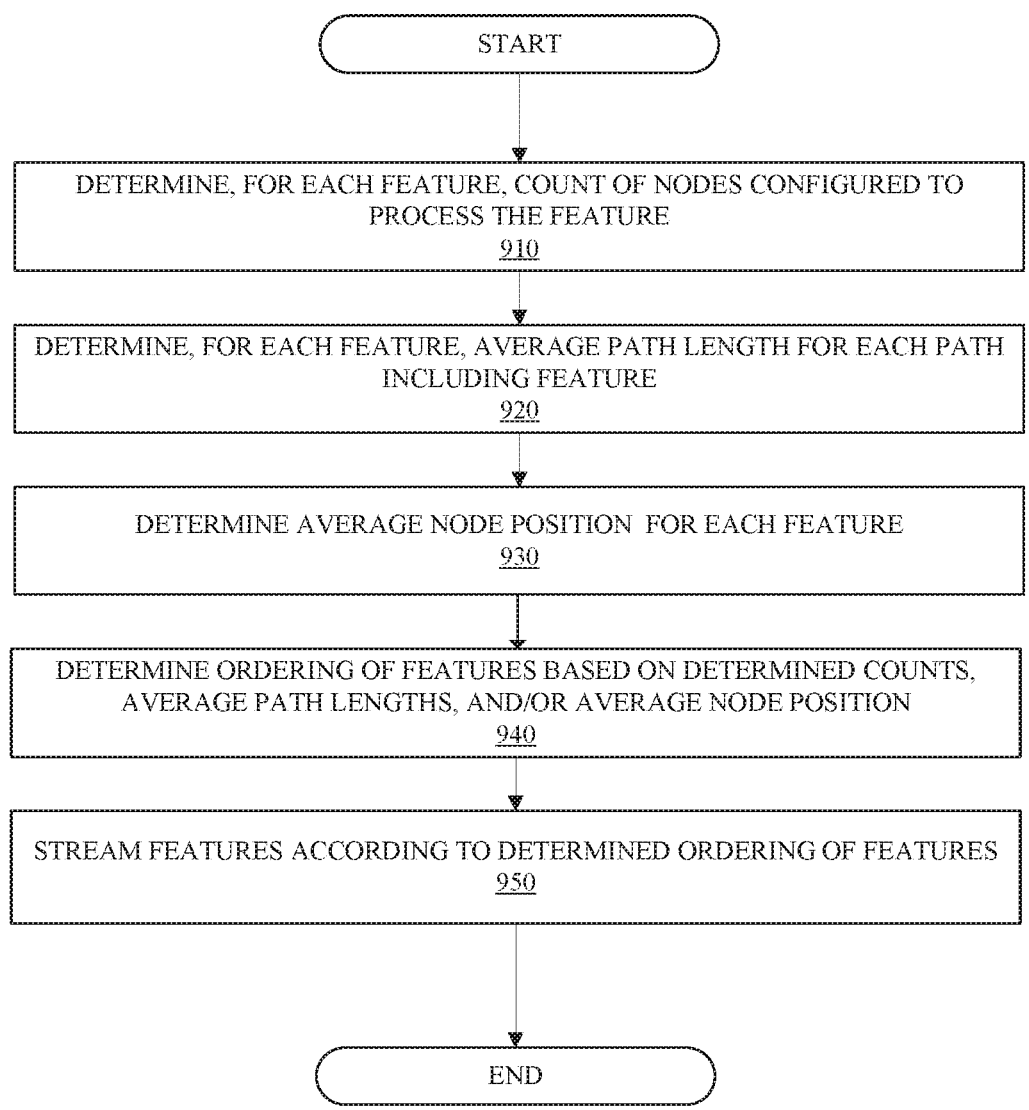
FIG. 9 illustrates an example of a first logic flow.

FIG. 9 illustrates an embodiment of a logic flow 900. The logic flow 900 may be representative of some or all of the operations executed by one or more embodiments described herein. For example, the logic flow 900 may represent some or all of the operations performed by the apparatus 101 and/or another computing system to determine the feature order 311 during training. Embodiments are not limited in this context.

As shown, the logic flow 900 begins at block 910, where a count of nodes 106 having a configuration 202 specifying to select (or process) a feature is determined for each of a plurality of features. The count for each feature may be based on each node 106 of each tree 105 in the random forest 104. For example, the feature ID for feature "C" may be specified as a selected feature 503 in the node configuration 202 for 500 nodes, while the feature ID for feature "D" may be specified as a selected feature 503 in the node configuration 202 for 100 nodes. Generally, such counts would cause the feature order 311 to place feature C in a higher relative position than feature D.

At block 920, an average path length is determined for each path that includes a given feature. For example, the average path length of all paths of all trees 105 that include feature C may be 5.5 nodes. Similarly, the average path length of all paths of all trees 105 that include feature D may be 3.3 nodes. Therefore, based on average path length, feature D may have a higher relative ordering in the feature order 311. At block 930, the average node position of each node that selects a given feature is determined for each feature. For example, the nodes 106 in each tree may be ordered based on processing flow. Therefore, features that are considered by nodes 106 that are earlier in the processing flow may cause the average node position to be lower for the feature. For example, the average node position for feature C may be 10 and 20 for feature D. Therefore, based on node position, feature C may have a higher relative ordering than feature D in the feature order 311.

At block 940, the feature order 311 is determined based on one or more of the feature count, average path length, and/or average node positions determined at blocks 910-930 respectively. For example, the feature order 311 may rank feature C higher than feature D, indicating feature C has greater relative importance. Doing so may cause the feature streamer 103 to stream features according to the feature order 311 at block 950.

Figure 10:
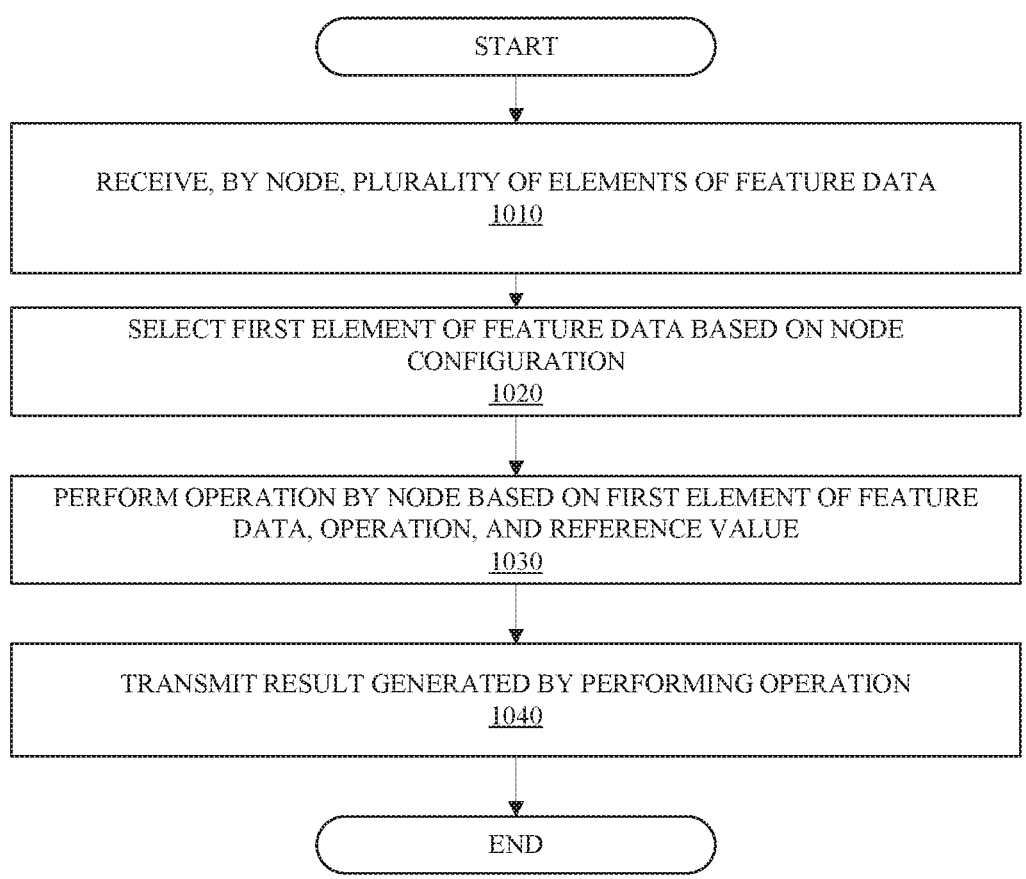
FIG. 10 illustrates an example of a second logic flow.

FIG. 10 illustrates an embodiment of a logic flow 1000. The logic flow 1000 may be representative of some or all of the operations executed by one or more embodiments described herein. For example, the logic flow 1000 may be representative of some or all of the operations executed by a node 106. Embodiments are not limited in this context.

As shown, the logic flow 1000 begins at block 1010, where an example node 106 receives a plurality of elements of feature data 121. The plurality of elements of feature data 121 may be a batch that is ordered according to the feature order 311. Each element of feature data 121 may have a corresponding feature ID. At block 1020, the node 106 selects a first feature of the plurality of features based on the configuration 202 for the node 106. For example, the feature IDs received at block 1010 may include ID values of 100, 200, and 300. If the node configuration 202 for the node 106 specifies the feature ID of 200, the node 106 selects the feature ID 200 and corresponding value (e.g., 0.25) as the first feature, while ignoring the remaining elements of feature data. At block 1030, the node 106 performs an operation (e.g., less than) specified by an operation ID in the node configuration 202. The operation may be applied to the value of the first element of feature data and a reference value (e.g., 0.1). At block 1040, the result of the operation performed at block 1030 is outputted via the node interconnect 107. For example, the result of the operation may be false based on the operation determining whether 0.25 is less than 0.1.

Figure 11:
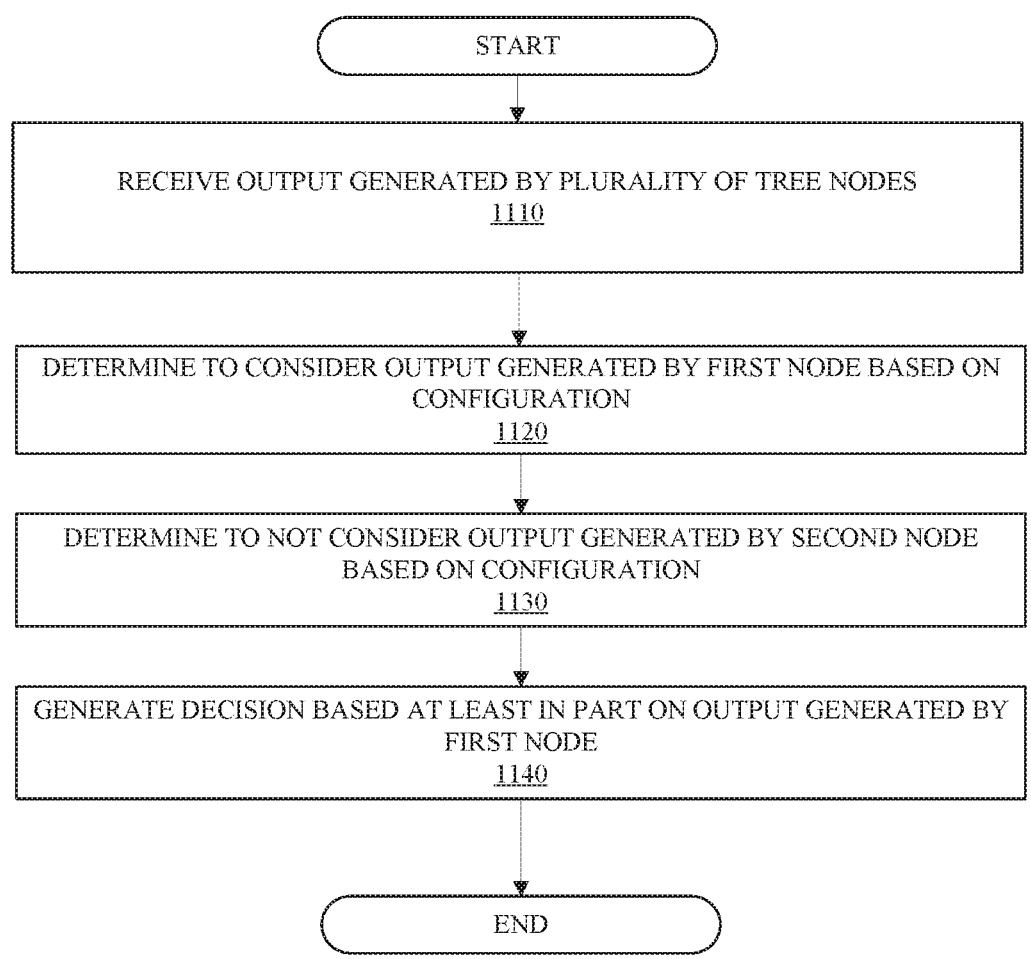
FIG. 11 illustrates an example of a third logic flow.

FIG. 11 illustrates an embodiment of a logic flow 1100. The logic flow 1100 may be representative of some or all of the operations executed by one or more embodiments described herein. For example, the logic flow 1100 may be representative of some or all of the operations executed by the node interconnect 107. Embodiments are not limited in this context.

As shown, the logic flow 1100 begins at block 1110, where the node interconnect 107 receives a respective output generated by each of a plurality of nodes 106-1 through 106-N. At block 1120, the node interconnect 107 determines to consider an output of a first node of the plurality of nodes based on the configuration 204 for the node interconnect 107. At block 1130, the node interconnect 107 determines to refrain from considering an output of a second node of the plurality of nodes based on the configuration 204 for the node interconnect 107. At block 1140, the tree 105 generates a decision based at least in part on the output of the first node and without considering the output of the second node.

Figure 12:
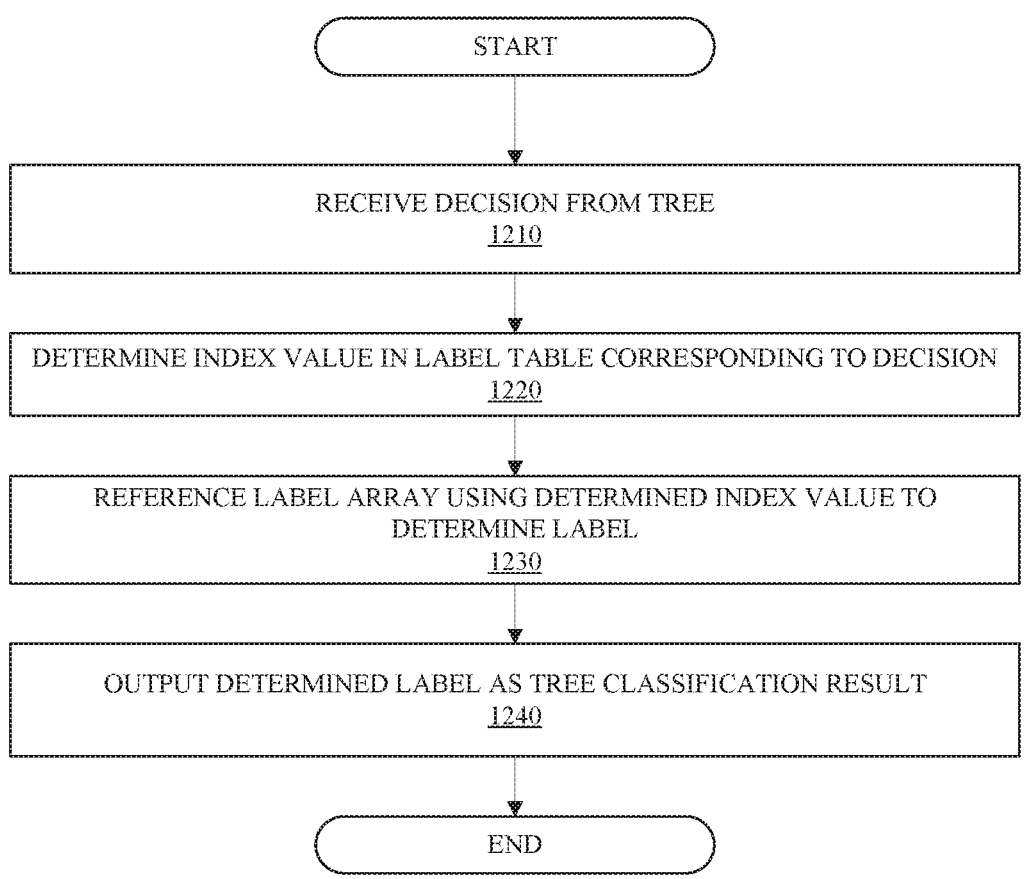
FIG. 12 illustrates an example of a fourth logic flow.

FIG. 12 illustrates an embodiment of a logic flow 1200. The logic flow 1200 may be representative of some or all of the operations executed by one or more embodiments described herein. For example, the logic flow 1200 may be representative of some or all of the operations executed to translate decisions generated by trees 105 to labels by the label translator 111. Embodiments are not limited in this context.

As shown, at block 1210, the label translator 111 receives a decision from a first tree 105-1. At block 1220, the label translator 111 references the label table 701 to return an index value corresponding to the decision received from the first tree 105-1. At block 1230, the label translator 111 references the label array 702 using the index value returned at block 1220 to determine a label for the decision of the tree 105-1. The index value may generally correspond to a position in the label array 702. The label in the corresponding position of the label array 702 may be returned as the classification result for the tree 105-1 at block 1240.

Figure 13:
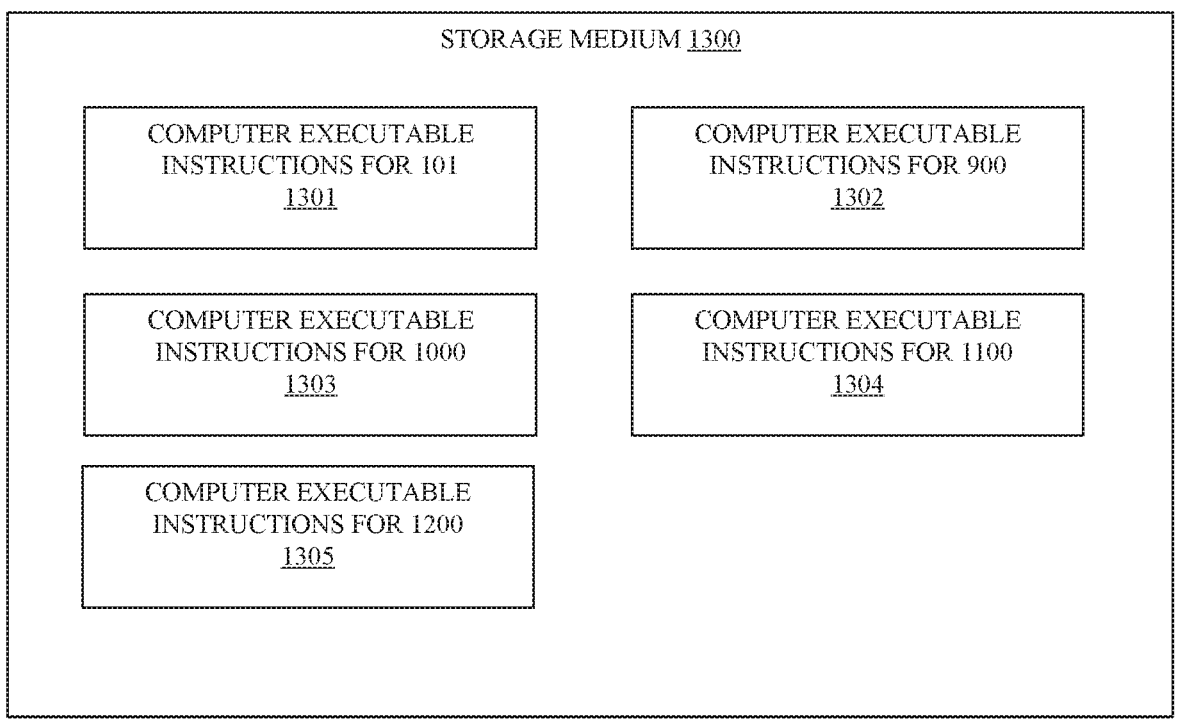
FIG. 13 illustrates an embodiment of a storage medium.

FIG. 13 illustrates an embodiment of a storage medium 1300. Storage medium 1300 may comprise any non-transitory computer-readable storage medium or machine-readable storage medium, such as an optical, magnetic or semiconductor storage medium. In various embodiments, storage medium 1300 may comprise an article of manufacture. In some embodiments, storage medium 1300 may store computer-executable instructions, such as computer-executable instructions to implement one or more of logic flows or operations described herein, such as instructions 1301 for the apparatus 101 (and all components thereof). The storage medium 1300 may store computer-executable instructions 1302-1305 for logic flows 900, 1000, 1100, and 1200 of FIGS. 9-12 respectively. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 14:
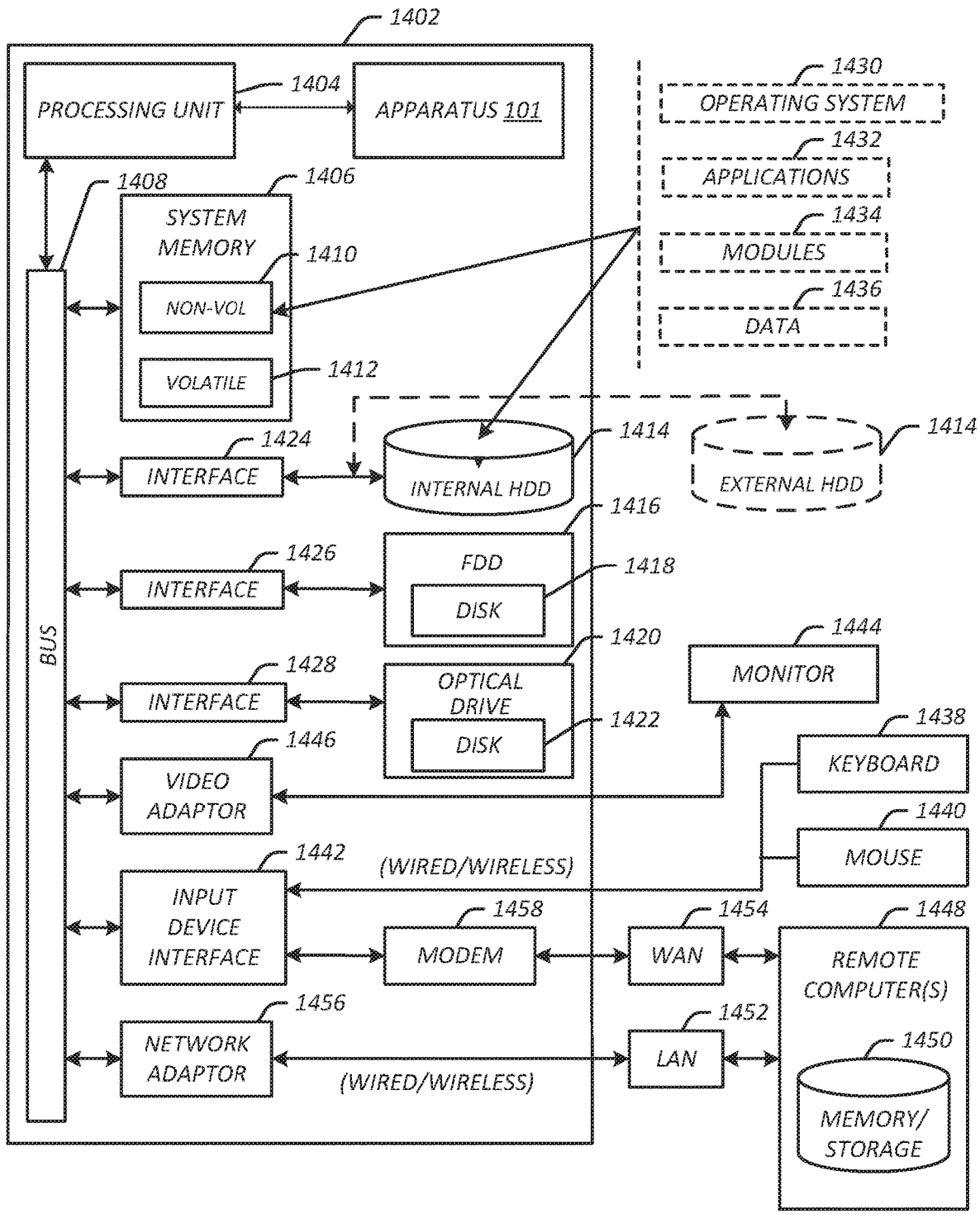
FIG. 14 illustrates an embodiment of a system.

FIG. 14 illustrates an embodiment of an exemplary computing architecture 1400 comprising a computing system 1402 that may be suitable for implementing various embodiments as previously described. In various embodiments, the computing architecture 1400 may comprise or be implemented as part of an electronic device. In some embodiments, the computing architecture 1400 may be representative, for example, of a system that implements one or more components of the system 100. In some embodiments, computing system 1402 may be representative, for example, of the apparatus 101 of the system 100. The embodiments are not limited in this context. More generally, the computing architecture 1400 is configured to implement all logic, applications, systems, methods, apparatuses, and functionality described herein with reference to FIGS. 1-13.

As used in this application, the terms "system" and "component" and "module" are intended to refer to a computer-related entity, either hardware, a combination of hardware and software, software, or software in execution, examples of which are provided by the exemplary computing architecture 1400. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 1402 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1402.

As shown in FIG. 14, the computing system 1402 comprises a processor 1404, a system memory 1406 and a system bus 1408. The processor 1404 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 1404.

The system bus 1408 provides an interface for system components including, but not limited to, the system memory 1406 to the processor 1404. The system bus 1408 can be any of several types of bus structure that may further interconnect to a memory bus (with or without a memory controller), a peripheral bus, and a local bus using any of a variety of commercially available bus architectures. In one embodiment, the bus 1408 comprises the interconnects 107, 109, 110, and/or 112 of FIG. 1. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computing system 1402 may include various types of computer-readable storage media in the form of one or more lower speed memory units, including an internal (or external) hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies. The computing system 1402 is generally is configured to implement all logic, systems, methods, apparatuses, and functionality described herein with reference to FIGS. 1-10.

The drives and associated computer-readable media provide volatile and/or nonvolatile storage of data, data structures, computer-readable instructions, computer-executable instructions, and so forth. For example, a number of program modules can be stored in the drives and memory units 1410, 1412, including an operating system 1430, one or more application programs 1432, other program modules 1434, and program data 1436. In one embodiment, the one or more application programs 1432, other program modules 1434, and program data 1436 can include, for example, the various applications and/or components of the system 100, such as the apparatus 101, data sources 120, the feature data 121, and/or the configuration data 122.

A user can enter commands and information into the computing system 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1404 through an input device interface 1442 that is coupled to the system bus 1408, but can be connected by other interfaces such as a parallel port, IEEE 1394 serial port, a game port, a USB port, an IR interface, and so forth.

A monitor 1444 or other type of display device is also connected to the system bus 1408 via an interface, such as a video adaptor 1446. The monitor 1444 may be internal or external to the computing system 1402. In addition to the monitor 1444, a computer typically includes other peripheral output devices, such as speakers, printers, and so forth.

The computing system 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computing system 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computing system 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computing system 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computing system 1402, or portions thereof, can be stored in the remote memory/storage device 1450. It will be appreciated that the network connections shown are exemplary and other means of establishing a communications link between the computers can be used.

The computing system 1402 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.14x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

The following examples pertain to further embodiments, from which numerous permutations and configurations will be apparent.

Example 1 is an apparatus, comprising: circuitry for an interconnect; and circuitry for a random forest implemented in hardware, the random forest to comprise a plurality of decision trees connected via the interconnect, each decision tree to comprise a plurality of nodes connected via the interconnect, a first decision tree of the plurality of decision trees to comprise a first node of the plurality of nodes to: receive a plurality of elements of feature data via the interconnect select a first element of feature data, of the plurality of elements of feature data, based on a configuration of the first node; and generate an output based on the first element of feature data, an operation, and a reference value, the operation and reference value specified in the configuration of the first node.

Example 2 includes the subject matter of example 1, comprising the first node to: receive an updated configuration specifying a second element of feature data of the plurality of elements of feature data, an updated operation, and an updated reference value; and update the configuration of the first node based on the updated configuration, wherein the first and second elements of feature data correspond to different features.

Example 3 includes the subject matter of example 2, comprising the first node to: receive a second plurality of elements of feature data via the interconnect select the second element of feature data of the second plurality of elements of feature data based on the updated configuration of the first node; and generate a second output based on the second element of feature data, the updated operation, and the updated reference value.

Example 4 includes the subject matter of example 1, comprising the circuitry for the interconnect to: receive the output generated by the first node determine, based on a configuration of the interconnect, to use the output generated by the first node to generate a decision for the first decision tree; and cause the decision for the first decision tree to be generated based at least in part on the output generated by the first node.

Example 5 includes the subject matter of example 4, comprising the circuitry for the interconnect to: receive an updated configuration for the interconnect, the updated configuration specifying to not use the output generated by the first node to generate the decision for the first decision tree; and update the configuration of the interconnect based on the updated configuration for the interconnect.

Example 6 includes the subject matter of example 5, comprising the circuitry for the interconnect to: receive a second output generated by the first node; and cause a second decision to be generated for the first decision tree without using the second output generated by the first node.

Example 7 includes the subject matter of example 4, comprising the circuitry for the random forest to: receive the decision for the first decision tree; and determine a label for the decision of the first decision tree based on a lookup table indexed using the decision from the first decision tree.

Example 8 includes the subject matter of example 7, the circuitry for the random forest to: determine the label is returned by a majority of the decision trees; and determine the label as a final output of the random forest without receiving a decision from each of the decision trees.

Example 9 includes the subject matter of example 8, the circuitry for the random forest implemented in an autonomous vehicle, the autonomous vehicle to modify an operational parameter of the autonomous vehicle based on the final output of the random forest.

Example 10 includes the subject matter of example 1, the plurality of elements of feature data to be received by the first node according to an ordering of the plurality of elements of feature data, the ordering to be determined based a respective count for each element of feature data, each count to be determined based on a count of nodes in each decision tree having a configuration specifying to select the corresponding element of feature data.

Example 11 is a method, comprising: receiving, by a first node via an interconnect, a plurality of elements of feature data, wherein circuitry for a random forest implemented in hardware comprises a plurality of decision trees connected via the interconnect, wherein each decision tree comprises a plurality of nodes connected via the interconnect, a first decision tree of the plurality of decision trees comprising the first node selecting, by the first node, a first element of feature data, of the plurality of elements of feature data, based on a configuration of the first node; and generating, by the first node, an output based on the first element of feature data, an operation, and a reference value, the operation and reference value specified in the configuration of the first node.

Example 12 includes the subject matter of example 11, further comprising: receiving, by the first node, an updated configuration specifying a second element of feature data of the plurality of elements of feature data, an updated operation, and an updated reference value; and updating, by the first node, the configuration of the first node based on the updated configuration, wherein the first and second elements of feature data correspond to different features.

Example 13 includes the subject matter of example 12, further comprising: receiving, by the first node, a second plurality of elements of feature data via the interconnect selecting, by the first node, the second element of feature data of the second plurality of elements of feature data based on the updated configuration of the first node; and generating, by the first node, a second output based on the second element of feature data, the updated operation, and the updated reference value.

Example 14 includes the subject matter of example 11, further comprising: receiving, by the interconnect, the output generated by the first node determining, by the interconnect based on a configuration of the interconnect, to use the output generated by the first node to generate a decision for the first decision tree; and causing, by the interconnect, the decision for the first decision tree to be generated based at least in part on the output generated by the first node.

Example 15 includes the subject matter of example 14, further comprising: receiving, by the interconnect, an updated configuration for the interconnect, the updated configuration specifying to not use the output generated by the first node to generate the decision for the first decision tree; and updating the configuration of the interconnect based on the updated configuration for the interconnect.

Example 16 includes the subject matter of example 15, further comprising: receiving, by the interconnect, a second output generated by the first node; and causing, by the interconnect, a second decision to be generated for the first decision tree without using the second output generated by the first node.

Example 17 includes the subject matter of example 14, further comprising: receiving the decision for the first decision tree; and determining a label for the decision of the first decision tree based on a lookup table indexed using the decision from the first decision tree.

Example 18 includes the subject matter of example 17, further comprising: determining the label is returned by a majority of the decision trees; and determining the label as a final output of the random forest without receiving a decision from each of the decision trees.

Example 19 includes the subject matter of example 18, the circuitry for the random forest implemented in an autonomous vehicle, the autonomous vehicle to modify an operational parameter of the autonomous vehicle based on the final output of the random forest.

Example 20 includes the subject matter of example 11, the plurality of elements of feature data to be received by the first node according to an ordering of the plurality of elements of feature data, the ordering to be determined based a respective count for each element of feature data, each count to be determined based on a count of nodes in each decision tree having a configuration specifying to select the corresponding element of feature data.

Example 21 is an autonomous vehicle, comprising: circuitry for an interconnect; and circuitry for a random forest implemented in hardware, the random forest to comprise a plurality of decision trees connected via the interconnect, each decision tree to comprise a plurality of nodes connected via the interconnect, a first decision tree of the plurality of decision trees to comprise a first node of the plurality of nodes to: receive a plurality of elements of feature data via the interconnect select a first element of feature data, of the plurality of elements of feature data, based on a configuration of the first node; and generate an output based on the first element of feature data, an operation, and a reference value, the operation and reference value specified in the configuration of the first node.

Example 22 includes the subject matter of example 21, comprising the first node to: receive an updated configuration specifying a second element of feature data of the plurality of elements of feature data, an updated operation, and an updated reference value; and update the configuration of the first node based on the updated configuration, wherein the first and second elements of feature data correspond to different features.

Example 23 includes the subject matter of example 22, comprising the first node to: receive a second plurality of elements of feature data via the interconnect select the second element of feature data of the second plurality of elements of feature data based on the updated configuration of the first node; and generate a second output based on the second element of feature data, the updated operation, and the updated reference value.

Example 24 includes the subject matter of example 21, comprising the circuitry for the interconnect to: receive the output generated by the first node determine, based on a configuration of the interconnect, to use the output generated by the first node to generate a decision for the first decision tree; and cause the decision for the first decision tree to be generated based at least in part on the output generated by the first node.

Example 25 includes the subject matter of example 24, comprising the circuitry for the interconnect to: receive an updated configuration for the interconnect, the updated configuration specifying to not use the output generated by the first node to generate the decision for the first decision tree; and update the configuration of the interconnect based on the updated configuration for the interconnect.

Example 26 includes the subject matter of example 25, comprising the circuitry for the interconnect to: receive a second output generated by the first node; and cause a second decision to be generated for the first decision tree without using the second output generated by the first node.

Example 27 includes the subject matter of example 24, comprising the circuitry for the random forest to: receive the decision for the first decision tree; and determine a label for the decision of the first decision tree based on a lookup table indexed using the decision from the first decision tree.

Example 28 includes the subject matter of example 27, the circuitry for the random forest to: determine the label is returned by a majority of the decision trees; and determine the label as a final output of the random forest without receiving a decision from each of the decision trees.

Example 29 includes the subject matter of example 28, the autonomous vehicle to modify an operational parameter of the autonomous vehicle based on the final output of the random forest.

Example 30 includes the subject matter of example 21, the plurality of elements of feature data to be received by the first node according to an ordering of the plurality of elements of feature data, the ordering to be determined based a respective count for each element of feature data, each count to be determined based on a count of nodes in each decision tree having a configuration specifying to select the corresponding element of feature data.

Example 31 is an apparatus, comprising: means for receiving, by a first node via an interconnect, a plurality of elements of feature data, wherein circuitry for a random forest implemented in hardware is to comprise a plurality of decision trees connected via the interconnect, wherein each decision tree is to comprise a plurality of nodes connected via the interconnect, a first decision tree of the plurality of decision trees comprising the first node means for selecting, by the first node, a first element of feature data, of the plurality of elements of feature data, based on a configuration of the first node; and means for generating, by the first node, an output based on the first element of feature data, an operation, and a reference value, the operation and reference value specified in the configuration of the first node.

Example 32 includes the subject matter of example 31, further comprising: means for receiving, by the first node, an updated configuration specifying a second element of feature data of the plurality of elements of feature data, an updated operation, and an updated reference value; and means for updating, by the first node, the configuration of the first node based on the updated configuration, wherein the first and second elements of feature data correspond to different features.

Example 33 includes the subject matter of example 32, further comprising: means for receiving, by the first node, a second plurality of elements of feature data via the interconnect means for selecting, by the first node, the second element of feature data of the second plurality of elements of feature data based on the updated configuration of the first node; and means for generating, by the first node, a second output based on the second element of feature data, the updated operation, and the updated reference value.

Example 34 includes the subject matter of example 31, further comprising: means for receiving, by the interconnect, the output generated by the first node means for determining, by the interconnect based on a configuration of the interconnect, to use the output generated by the first node to generate a decision for the first decision tree; and means for causing, by the interconnect, the decision for the first decision tree to be generated based at least in part on the output generated by the first node.

Example 35 includes the subject matter of example 34, further comprising: means for receiving, by the interconnect, an updated configuration for the interconnect, the updated configuration specifying to not use the output generated by the first node to generate the decision for the first decision tree; and means for updating the configuration of the interconnect based on the updated configuration for the interconnect.

Example 36 includes the subject matter of example 35, further comprising: means for receiving, by the interconnect, a second output generated by the first node; and means for causing, by the interconnect, a second decision to be generated for the first decision tree without using the second output generated by the first node.

Example 37 includes the subject matter of example 34, further comprising: means for receiving the decision for the first decision tree; and means for determining a label for the decision of the first decision tree based on a lookup table indexed using the decision from the first decision tree.

Example 38 includes the subject matter of example 37, further comprising: means for determining the label is returned by a majority of the decision trees; and means for determining the label as a final output of the random forest without receiving a decision from each of the decision trees.

Example 39 includes the subject matter of example 38, the circuitry for the random forest implemented in an autonomous vehicle, the autonomous vehicle to modify an operational parameter of the autonomous vehicle based on the final output of the random forest.

Example 40 includes the subject matter of example 31, the plurality of elements of feature data to be received by the first node according to an ordering of the plurality of elements of feature data, the ordering to be determined based a respective count for each element of feature data, each count to be determined based on a count of nodes in each decision tree having a configuration specifying to select the corresponding element of feature data.

In addition, in the foregoing, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An apparatus, comprising:
   circuitry for an interconnect; and
   circuitry for a random forest implemented in hardware, the random forest to comprise a plurality of decision trees connected via the interconnect, each decision tree to comprise a plurality of nodes connected via the interconnect, a first decision tree of the plurality of decision trees to comprise a first node of the plurality of nodes to:
receive a plurality of elements of feature data via the interconnect;
select a first element of feature data, of the plurality of elements of feature data, based on a configuration of the first node; and
generate an output based on the first element of feature data, an operation, and a reference value, the operation and reference value specified in the configuration of the first node.

2. The apparatus of claim 1, comprising the first node to:
receive an updated configuration specifying a second element of feature data of the plurality of elements of feature data, an updated operation, and an updated reference value; and
update the configuration of the first node based on the updated configuration, wherein the first and second elements of feature data correspond to different features.

3. The apparatus of claim 2, comprising the first node to:
receive a second plurality of elements of feature data via the interconnect;
select the second element of feature data of the second plurality of elements of feature data based on the updated configuration of the first node; and
generate a second output based on the second element of feature data, the updated operation, and the updated reference value.

4. The apparatus of claim 1, comprising the circuitry for the interconnect to:
receive the output generated by the first node;
determine, based on a configuration of the interconnect, to use the output generated by the first node to generate a decision for the first decision tree; and
cause the decision for the first decision tree to be generated based at least in part on the output generated by the first node.

5. The apparatus of claim 4, comprising the circuitry for the interconnect to:
receive an updated configuration for the interconnect, the updated configuration specifying to not use the output generated by the first node to generate the decision for the first decision tree; and
update the configuration of the interconnect based on the updated configuration for the interconnect.

6. The apparatus of claim 5, comprising the circuitry for the interconnect to:
receive a second output generated by the first node; and
cause a second decision to be generated for the first decision tree without using the second output generated by the first node.

7. The apparatus of claim 4, comprising the circuitry for the random forest to:
receive the decision for the first decision tree; and
determine a label for the decision of the first decision tree based on a lookup table indexed using the decision from the first decision tree.

8. The apparatus of claim 7, the circuitry for the random forest to:
determine the label is returned by a majority of the decision trees; and
determine the label as a final output of the random forest without receiving a decision from each of the decision trees.

9. The apparatus of claim 8, the circuitry for the random forest implemented in an autonomous vehicle, the autonomous vehicle to modify an operational parameter of the autonomous vehicle based on the final output of the random forest.

10. The apparatus of claim 1, the plurality of elements of feature data to be received by the first node according to an ordering of the plurality of elements of feature data, the ordering to be determined based a respective count for each element of feature data, each count to be determined based on a count of nodes in each decision tree having a configuration specifying to select the corresponding element of feature data.

11. A method, comprising:
receiving, by a first node via an interconnect, a plurality of elements of feature data, wherein circuitry for a random forest implemented in hardware comprises a plurality of decision trees connected via the interconnect, wherein each decision tree comprises a plurality of nodes connected via the interconnect, a first decision tree of the plurality of decision trees comprising the first node;
selecting, by the first node, a first element of feature data, of the plurality of elements of feature data, based on a configuration of the first node; and
generating, by the first node, an output based on the first element of feature data, an operation, and a reference value, the operation and reference value specified in the configuration of the first node.

12. The method of claim 11, further comprising:
receiving, by the first node, an updated configuration specifying a second element of feature data of the plurality of elements of feature data, an updated operation, and an updated reference value; and
updating, by the first node, the configuration of the first node based on the updated configuration, wherein the first and second elements of feature data correspond to different features.

13. The method of claim 12, further comprising:
receiving, by the first node, a second plurality of elements of feature data via the interconnect;
selecting, by the first node, the second element of feature data of the second plurality of elements of feature data based on the updated configuration of the first node; and
generating, by the first node, a second output based on the second element of feature data, the updated operation, and the updated reference value.

14. The method of claim 11, further comprising:
receiving, by the interconnect, the output generated by the first node;
determining, by the interconnect based on a configuration of the interconnect, to use the output generated by the first node to generate a decision for the first decision tree; and
causing, by the interconnect, the decision for the first decision tree to be generated based at least in part on the output generated by the first node.

15. The method of claim 14, further comprising:
receiving, by the interconnect, an updated configuration for the interconnect, the updated configuration specifying to not use the output generated by the first node to generate the decision for the first decision tree; and
updating the configuration of the interconnect based on the updated configuration for the interconnect.

16. The method of claim 15, further comprising:
receiving, by the interconnect, a second output generated by the first node; and
causing, by the interconnect, a second decision to be generated for the first decision tree without using the second output generated by the first node.

17. The method of claim 14, further comprising:
receiving the decision for the first decision tree;
determining a label for the decision of the first decision tree based on a lookup table indexed using the decision from the first decision tree;
determining the label is returned by a majority of the decision trees; and
determining the label as a final output of the random forest without receiving a decision from each of the decision trees.

18. An autonomous vehicle, comprising:
circuitry for an interconnect; and
circuitry for a random forest implemented in hardware, the random forest to comprise a plurality of decision trees connected via the interconnect, each decision tree to comprise a plurality of nodes connected via the interconnect, a first decision tree of the plurality of decision trees to comprise a first node of the plurality of nodes to:
receive a plurality of elements of feature data via the interconnect;
select a first element of feature data, of the plurality of elements of feature data, based on a configuration of the first node; and
generate an output based on the first element of feature data, an operation, and a reference value, the operation and reference value specified in the configuration of the first node.

19. The autonomous vehicle of claim 18, comprising the first node to:
receive an updated configuration specifying a second element of feature data of the plurality of elements of feature data, an updated operation, and an updated reference value; and
update the configuration of the first node based on the updated configuration, wherein the first and second elements of feature data correspond to different features.

20. The autonomous vehicle of claim 19, comprising the first node to:
receive a second plurality of elements of feature data via the interconnect;
select the second element of feature data of the second plurality of elements of feature data based on the updated configuration of the first node; and
generate a second output based on the second element of feature data, the updated operation, and the updated reference value.

* * * * *